United States Patent
Fortes Montilla et al.

(10) Patent No.: US 12,068,616 B2
(45) Date of Patent: Aug. 20, 2024

(54) METHOD FOR CONTROLLING THE INDUCTIVE CHARGING OF A USER DEVICE AND ASSOCIATED CHARGING DEVICE FOR MOTOR VEHICLE

(71) Applicant: Continental Automotive GmbH, Hannover (DE)

(72) Inventors: Amaia Fortes Montilla, Toulouse (FR); Youri Vassilieff, Toulouse (FR)

(73) Assignee: Continental Automotive GmbH, Hannover (DE)

( * ) Notice: Subject to any disclaimer, the term of this patent is extended or adjusted under 35 U.S.C. 154(b) by 480 days.

(21) Appl. No.: 17/604,214

(22) PCT Filed: May 14, 2020

(86) PCT No.: PCT/EP2020/063544
§ 371 (c)(1),
(2) Date: Oct. 15, 2021

(87) PCT Pub. No.: WO2020/234131
PCT Pub. Date: Nov. 26, 2020

(65) Prior Publication Data
US 2022/0209582 A1  Jun. 30, 2022

(30) Foreign Application Priority Data
May 17, 2019  (FR) ...................................... 1905190

(51) Int. Cl.
*H01M 10/44* (2006.01)
*H01M 10/46* (2006.01)
(Continued)

(52) U.S. Cl.
CPC .......... *H02J 50/12* (2016.02); *H02J 7/00712* (2020.01); *H02J 50/005* (2020.01); *H02J 50/402* (2020.01); *H02J 50/60* (2016.02); *H02J 2310/48* (2020.01)

(58) Field of Classification Search
CPC ...... H02J 7/00712; H02J 7/0044; H02J 50/10; H02J 50/12; H02J 50/005; H02J 50/402; H02J 50/60; H02J 2310/48; B60L 53/122
(Continued)

(56) References Cited

U.S. PATENT DOCUMENTS 10,371,848 B2  8/2019  Roy et al.
10,461,813 B2  10/2019  Louis
(Continued)

FOREIGN PATENT DOCUMENTS

CN  106489082 A  3/2017
CN  106663964 A  5/2017
(Continued)

OTHER PUBLICATIONS

Chinese Office Action for Chinese Application No. 202080036411.X, dated Jun. 10, 2023 with translation, 20 pages.
(Continued)

*Primary Examiner* — Edward Tso
(74) *Attorney, Agent, or Firm* — Buchanan Ingersoll & Rooney PC

(57) ABSTRACT

Controlling inductive charging of a portable item of user equipment by a charging device. The charging device including a reception surface receiving the item of user equipment, emitter coils and a magnetic field guide to direct a magnetic field in a plane parallel to the reception surface. The charging device equipped with at least two magnetic antennas, each to emit a magnetic field and each designed to partially receive the magnetic field emitted by the other
(Continued)

antenna. The method includes the following steps: Simultaneous emission by the two antennas, having a first phase shift at input with respect to one another; Measurement of at least one parameter at the output of the antennas; Storage of the measured parameter; Comparison between the at least one parameter thus measured and a predetermined value; Repetition of the preceding steps for other phase shift values; Controlling of the charging based on the comparison results.

17 Claims, 5 Drawing Sheets

(51) Int. Cl.
*H02J 7/00* (2006.01)
*H02J 50/00* (2016.01)
*H02J 50/12* (2016.01)
*H02J 50/40* (2016.01)
*H02J 50/60* (2016.01)

(58) Field of Classification Search
USPC .................. 320/107, 108, 114, 115; 307/104
See application file for complete search history.

(56) References Cited

U.S. PATENT DOCUMENTS

| | | | |
|---|---|---|---|
| 2013/0093387 A1* | 4/2013 | Vassilieff | B60L 53/126 320/108 |
| 2013/0169062 A1 | 7/2013 | Maikawa et al. | |
| 2014/0015480 A1 | 1/2014 | Cheikh et al. | |
| 2016/0016478 A1 | 1/2016 | Saito et al. | |
| 2017/0033591 A1 | 2/2017 | Govindaraj et al. | |
| 2017/0276820 A1 | 9/2017 | Adachi | |
| 2017/0317636 A1 | 11/2017 | Marson et al. | |
| 2018/0375385 A1 | 12/2018 | Li et al. | |
| 2020/0336174 A1 | 10/2020 | Cheikh et al. | |
| 2021/0242720 A1 | 8/2021 | Cheikh et al. | |

FOREIGN PATENT DOCUMENTS

| | | |
|---|---|---|
| CN | 107112787 A | 8/2017 |
| CN | 108028541 A | 5/2018 |
| CN | 109120075 A | 1/2019 |
| CN | 109496380 A | 3/2019 |
| FR | 2993418 A1 | 1/2014 |
| FR | 3082370 A1 | 12/2019 |
| JP | WO2014156655 A1 | 2/2017 |
| JP | 2017055528 A | 3/2017 |
| JP | 2017055529 A | 3/2017 |
| WO | 2019069009 A1 | 4/2019 |

OTHER PUBLICATIONS

Jadidian, J. et al., "Magnetic MIMO: How to Charge your Phone in your Pocket", Sep. 7-11, 2014, pp. 495-506 MobiCom 14, Maui, Hawaii.

International Search Report and Written Opinion for International Application No. PCT/EP2020/063544, mailed Jul. 10, 2020, with partial English translation, 7 pages.

International Search Report and Written Opinion for International Application No. PCT/EP2020/063544, mailed Jul. 10, 2020, 12 pages (French).

* cited by examiner

METHOD FOR CONTROLLING THE INDUCTIVE CHARGING OF A USER DEVICE AND ASSOCIATED CHARGING DEVICE FOR MOTOR VEHICLE

CROSS REFERENCE TO RELATED APPLICATIONS

This application is the U.S. National Phase Application of PCT International Application No. PCT/EP2020/063544, filed May 14, 2020, which claims priority to French Patent Application No. 1905190, filed May 17, 2019, the contents of such applications being incorporated by reference herein.

FIELD OF THE INVENTION

The invention relates to the field of inductive energy charging of an item of user equipment in a motor vehicle, and relates more specifically to a charging control method and to a device for the inductive charging of an item of user equipment in a motor vehicle.

BACKGROUND OF THE INVENTION

Some motor vehicles are nowadays provided with a device for inductively charging a battery of an item of user equipment, such as for example a mobile telephone. The term "battery" is understood in the present document to mean an electrical energy storage unit for supplying power to the item of user equipment.

Such a charging device comprises a management module, an emission module and a reception surface for receiving the item of user equipment. The emission module comprises at least one inductive emitter coil antenna that is coupled to the reception surface and that generates an electromagnetic field around the reception surface in what is called an "emission" area, by operating for example in a frequency band between 100 and 200 kHz. The management module of the device is configured so as to control the emission module, in particular the power level of the emission by the coil, so as to detect a variation in the voltage across the terminals of the emitter coil and to exchange messages with the item of user equipment.

The item of user equipment additionally comprises a control module and a receiver module. The receiver module comprises at least one inductive receiver coil antenna that detects an electromagnetic field generated by the charging device when it is positioned in the emission area of said device. The control module of the item of user equipment is configured so as to control the reception module and exchange messages with the charging device. One example of a magnetic induction-based power transfer system is known from the specification defined by the WPC consortium (the acronym standing for "Wireless Power Consortium"), known by the name "Qi low power specification" (version 1.2), which defines in particular the exchanges of messages between the charging device and the item of user equipment.

In a known manner, the electromagnetic field generated by the emitter coil induces an AC current in the receiver coil, which makes it possible to charge the battery of the item of user equipment.

Thus, when the user wishes to electrically charge the battery of his item of equipment, he positions it on the reception surface of the device, thereby causing the voltage at the output of at least one emitter coil of the device to vary.

The management module of the device detects this voltage variation and deduces therefrom that an at least partly metallic object has been positioned on the reception surface.

The management module of the device then sends a recognition message in order to ascertain whether the object positioned on the surface is an item of user equipment compatible with the charging device, that is to say that is able to be charged by the device, or else another object such as an incompatible item of user equipment or any other at least partly metallic object.

Therefore, when the item of user equipment is compatible with the device, its control module responds to the device by sending a compatibility message, and the inductive charging of the item of user equipment is started by said at least one emitter coil, until it finishes or the item of user equipment leaves the emission area.

When the vehicle is moving, it is frequently the case that the item of user equipment moves over the reception surface and is no longer located above the emitter coil that was activated for charging purposes. The new position of the item of user equipment on the reception surface has to be detected in order to activate a new emitter coil that is most suitable for charging the item of user equipment, in other words the new emitter coil located in a manner best aligned with the receiver coil of the item of user equipment.

In addition, it is necessary to check for the absence of any foreign metallic object underneath the portable item of equipment, even if the portable item of equipment moves over said surface, in order to ensure the user's safety.

One charging control method from the prior art consists for example in using temperature sensors that continuously measure the temperature at various points of the reception surface. Specifically, the presence of a metallic object, whether or not it is compatible with inductive charging, after sending a detection and location signal, such as for example the emission of a "PING", creates a local temperature increase on the reception surface, which is detected by the temperature sensors. However, the temperature measurement by such sensors is slow, and the inertia of detection poses a major drawback, especially if the user's safety is involved.

Another solution from the prior art consists in arranging a plurality of capacitive sensors below the reception surface and in measuring the variation in capacitance at the output of said sensors. One drawback of this solution lies in the sensitivity of the capacitive sensors to the presence of a body part of a user. If the user places an item of user equipment on the reception surface using his hand, the capacitive sensor detects a presence; however, once the item of user equipment has been placed, the capacitive sensors no longer make it possible to detect a movement of said item of equipment over the reception surface. In addition, the use of a mesh consisting of capacitive sensors is expensive.

Finally, a last solution from the prior art consists in measuring the quality factor at the terminals of each emitter coil in order to detect the presence of a metallic object. Specifically, the presence of a metallic object located opposite an emitter coil of the charging device, be this a portable item of user equipment or a metallic component not compatible with inductive charging, degrades the factor of quality of said coil. However, this detection and location method is able to be performed only when the inductive charging is stopped, since the method requires a dedicated signal to be sent by the coil and the return measurement of parameters at the terminals of the coil, this posing a major drawback.

An aspect of the invention targets a method for controlling inductive charging and a device for charging a portable item of user equipment that do not exhibit the drawbacks of the prior art, in this case, that make it possible to detect a metallic object on the reception surface, to locate said object, to determine its type (item of user equipment compatible for charging or stray foreign object), in order to adapt the inductive charging process appropriately, that is to say for example to lower or increase the charging power in order to optimize charging efficiency, to stop, and control the temperature of the surface or to stop the charging if necessary.

SUMMARY OF THE INVENTION

An aspect of the invention proposes a method for controlling the inductive charging of a portable item of user equipment by a charging device, said charging device comprising a reception surface able to receive the item of user equipment, emitter coils and a magnetic field guide able to direct a magnetic field in a plane parallel to the reception surface, the method being noteworthy in that the charging device is equipped in a preliminary step with at least two magnetic antennas, each designed to emit a magnetic field and each designed to partially receive the magnetic field emitted by the other antenna, and in that the method comprises the following steps:
 a. Simultaneous emission by the two antennas, having a first phase shift at input with respect to one another,
 b. Measurement of at least one parameter at the output of the antennas,
 c. Storage of the measured parameter,
 d. Comparison between the at least one parameter thus measured and a predetermined value,
 e. Repetition of the preceding steps for other phase shift values,
 f. Controlling of the charging based on the comparison results.

Preferably, the at least one measured parameter consists of a voltage and/or a phase between the current and the voltage that are measured at the output of each antenna.

The predetermined values may comprise either parameters measured without a metallic object on the reception surface, or parameters measured for a plurality of locations of metallic objects on the reception surface, or even parameters measured for a plurality of types of metallic object.

Advantageously, the predetermined values (V1iref, V2iref, φ1iref, φ2iref) consist of parameters that are measured at a previous time, for one and the same phase shift value.

An aspect of the invention also relates to a device for the inductive charging of a portable item of user equipment, intended to be housed on board a motor vehicle, comprising a reception surface able to receive the item of user equipment, emitter coils and a magnetic field guide able to direct a magnetic field in a plane parallel to the reception surface, the device being noteworthy in that it furthermore comprises:
 a. At least two magnetic antennas, each designed to emit a magnetic field and each designed to partially receive the magnetic field emitted by the other antenna,
 b. emission means electrically connected to the two antennas, comprising phase shift means for a phase shift between the antennas,
 c. reception and processing means comprising:
 d. measuring means for measuring at least one parameter at the output of the antennas,
 e. storage means for storing the measured parameter,
 f. comparison means for comparing between the at least one parameter thus measured and a predetermined value,
 g. detection means for detecting an object, for locating said object and the type of object on the reception surface on the basis of the result of the comparison,
 h. control means for controlling the charging on the basis of the detection performed.

Preferably, the measuring means for measuring parameters consist of measuring means for measuring a voltage and/or for measuring a phase at the output of the antennas.

Advantageously, the magnetic field guide consists of a ferrite.

In a first embodiment, the antennas are in the form of loops wound around the ferrite.

In a second embodiment, the antennas are in the form of planar windings located in a plane parallel to the reception surface.

Expediently, an emission frequency of the two magnetic antennas is between 20 kHz and 20 MHz; for example, the antennas are near-field communication radiofrequency antennas or inductive charging antennas.

An aspect of the invention also applies to any motor vehicle comprising a charging device according to any one of the features listed above.

BRIEF DESCRIPTION OF THE DRAWINGS

Further features and advantages of aspects of the invention will become more clearly apparent from reading the following description. This description is purely illustrative and must be read with reference to the accompanying drawings, in which.

DETAILED DESCRIPTION OF THE PREFERRED EMBODIMENTS

Figure 1:
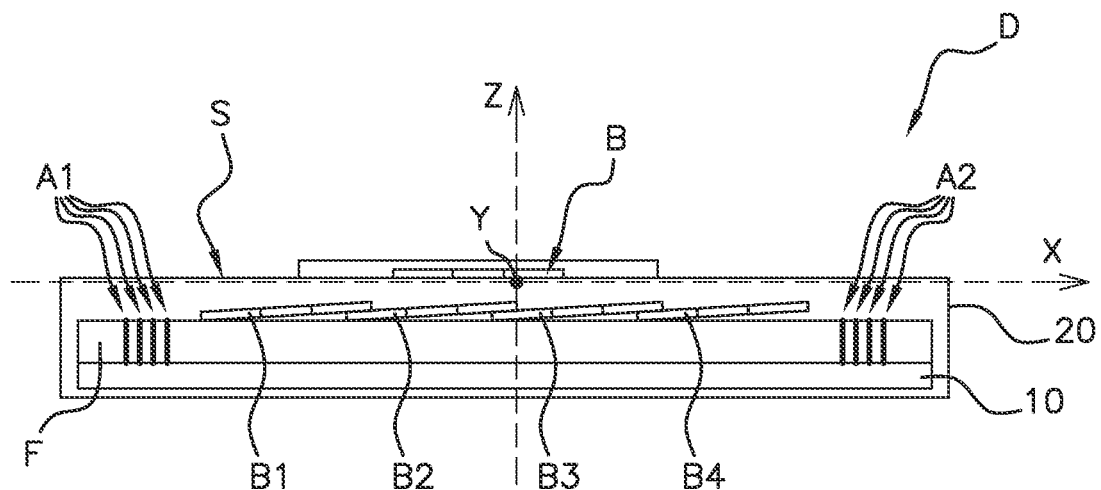
FIG. 1 shows a cross section of a charging device for charging a portable item of user equipment according to an aspect of the invention.

FIG. 1 illustrates a charging device D for charging an item of user equipment P. The item of user equipment P may be a mobile telephone, but also a tablet, and is placed on the reception surface S of the charging device D.

Figure 2:
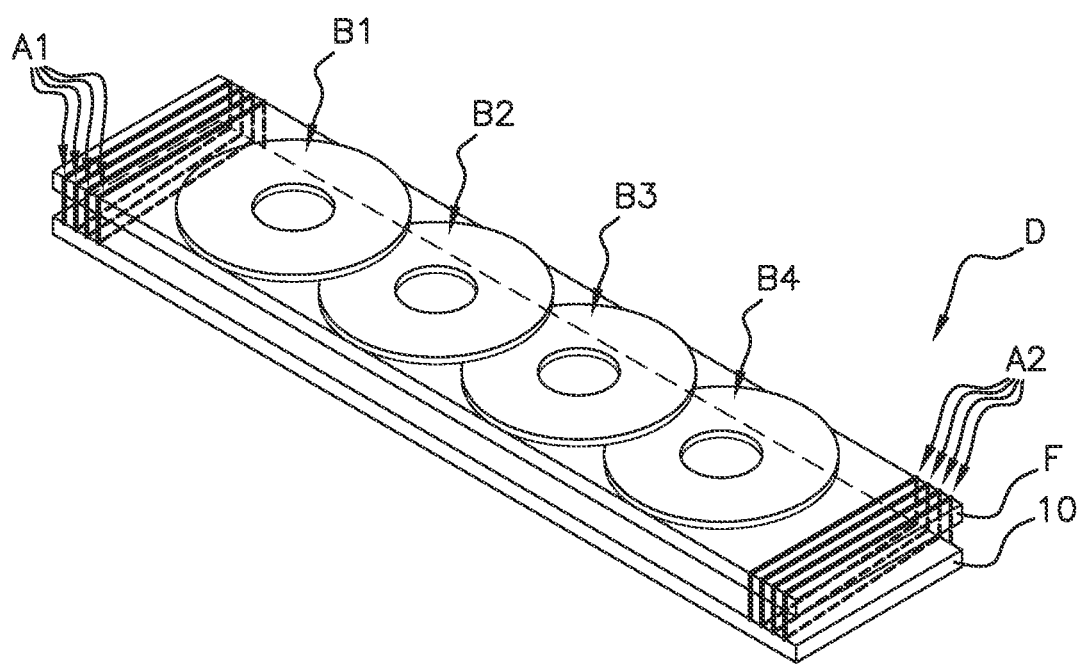
FIG. 2 shows a perspective view of the components of a charging device according to an aspect of the invention, FIG. 3 schematically shows a second embodiment of a charging device according to an aspect of the invention.

The charging device D comprises a plurality of emitter coils; in the example illustrated in FIGS. 1 and 2, there are four emitter coils, B1, B2, B3, B4 located under the reception surface S and designed to inductively charge the battery of the item of user equipment via the receiver coil B of said device, in accordance for example with the WPC standard.

The charging device D also comprises an electronic control circuit located for example in a printed circuit 10, making it possible to control the inductive charging by the emitter coils B1, B2, B3, B4 and also allowing communication in relation to the charging method between the charging device D and the item of user equipment P.

The charging device D also comprises a magnetic field guide, for example a ferrite F, that is to say a surface made of magnetic material, located under the emitter coils B1, B2, B3, B4 and able to redirect the electromagnetic field emitted by said emitter coils from the side opposite that where the ferrite is located in this case, in a plane parallel to the reception surface S, to the portable item of user equipment P. This charging device D is known from the prior art and will not be described in more detail here.

As explained above, it is necessary to detect the presence of a metallic object, and/or to determine its position on the reception surface S, and/or its type (either a portable item of user equipment compatible with inductive charging or a foreign metallic object), especially when the vehicle is moving, and the device D is moving over the surface S, in order to appropriately control the inductive charging process.

An aspect of the invention proposes to use two magnetic antennas, a first antenna A1 and a second antenna A2 that are arranged such that they each emit a magnetic field, and that they each partially receive the magnetic field emitted by the other antenna A1, A2 according to a longitudinal direction X parallel to the reception surface S. The two antennas A1 and A2 are in the form of loops of copper wire, preferably wound around one side of the ferrite F and being wound such that the magnetic field emitted by the first antenna A1 is received partially or fully by the second antenna A2, and vice versa. By virtue of the magnetic field guide, the emission of the magnetic field by said antennas propagates partially in a plane parallel to the reception surface S, for example, but without any limitation whatsoever, in a In other words, the magnetic fields emitted by the two antennas A1, A2 do not cancel one another out; more precisely, the two antennas A1, A2 do not have zero mutual inductance.

In the example illustrated in FIGS. 1 and 2, the charging device D and the ferrite F are rectangular. The first antenna A1 and the second antenna A2 are each wound, at one end of the ferrite F, around the longitudinal axis X. The two antennas, the first antenna A1 and the second antenna A2, are thus located opposite one another.

Of course, other embodiments are possible; the first antenna A1 and the second antenna A2 may for example be wound around the ferrite F and the printed circuit 10, or arranged close to the ferrite F without being wound around said ferrite F. This is illustrated in FIG. 3.

Figure 3:
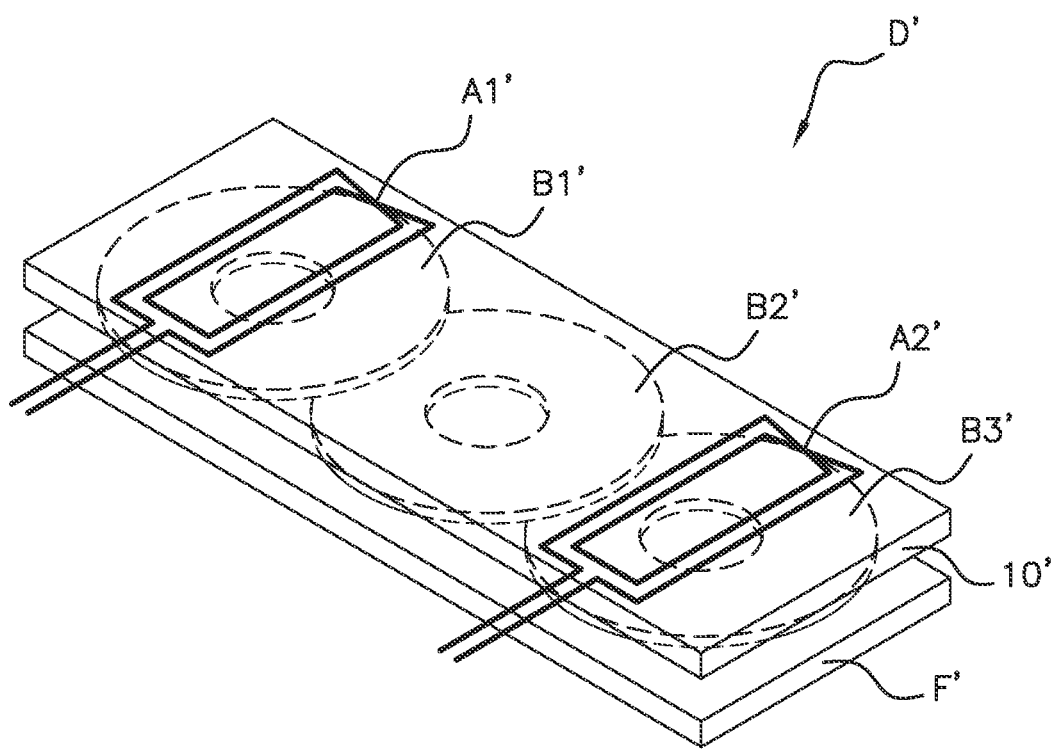

FIG. 3 illustrates a second embodiment of the charging device D' according to an aspect of the invention, comprising a first planar antenna A1' located at one end of the charging device D', along the longitudinal X axis, and a second planar antenna A2' located at the other, opposite end of said device D', in the longitudinal X direction. The two antennas A1', A2' are located above three emitter coils B1', B2', B3', which are themselves located above a ferrite F' and a printed circuit 10', which is positioned below said ferrite F'. It is also possible to arrange the two antennas A1', A2' under the emitter coils B1', B2', B3'.

This second embodiment, as well as the preferred embodiment of the charging device D illustrated in FIGS. 1 and 2, are in no way limiting. The two antennas A1, A2 may be in other forms; for example the antennas A1 and A2 may or may not be symmetrical about the longitudinal X axis, and they may or may not be symmetrical with one another about the transverse Y axis, the two X, Y axes being perpendicular to one another and forming a plane parallel to the reception surface S.

However, it is essential to an aspect of the invention that part of the magnetic field emitted by each antenna A1, A2, A1', A2' propagates in the X direction parallel to the reception surface S in order to be received by the other antenna located for example at the other end of the reception surface S. The ferrite F allows this guidance of the magnetic field parallel to the reception surface S, but any other magnetic field guide known to those skilled in the art may be used.

Preferably, the first antenna A1 and the second antenna A2 are near-field radiofrequency communication antennas, for example with a frequency equal to 13.56 MHz, or between 20 kHz and 20 MHz.

The antennas A1, A2 may also be inductive charging antennas.

Figure 4:
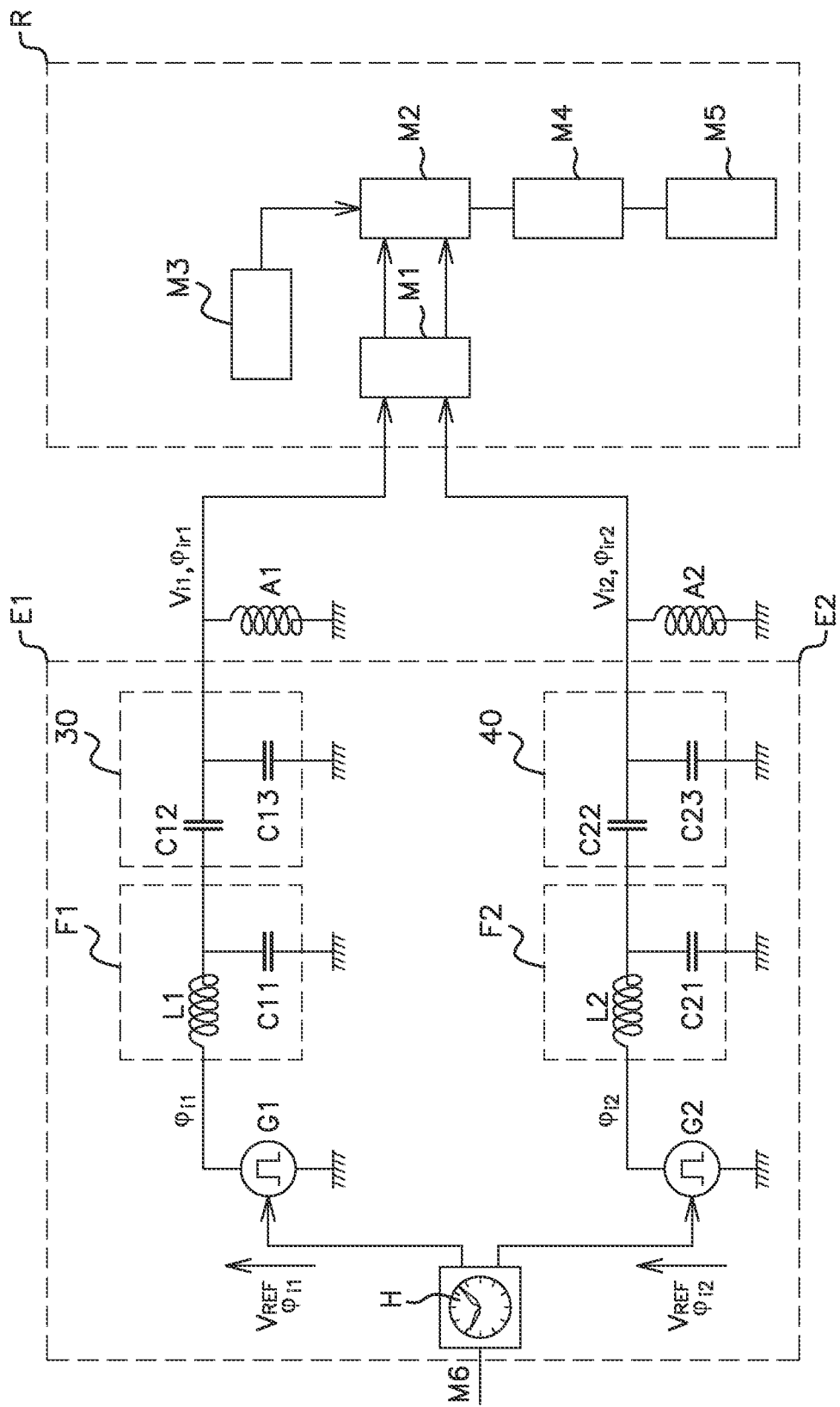
FIG. 4 is a schematic depiction of an electronic circuit comprising the magnetic antennas A1, A2, the emission means E1, E2 for emitting the magnetic field of said antennas, and the reception and processing means R for receiving and processing the magnetic field received by said antennas of the charging device according to an aspect of the invention.

According to an aspect of the invention, each of the antennas A1, A2 is electrically connected to emission means E1, E2 for emitting a magnetic field and reception and processing means R for receiving and processing the received magnetic field. This is illustrated in FIG. 4. The emission means E1, E2 and the reception and processing means R are located for example on the printed circuit 10'.

The emission means A1, A2 each comprise a generator G1, G2 for generating a sinusoidal voltage Vref, connected to phase shift means M6 for each antenna A1, A2, making it possible to adapt the phase between the current and the supply voltage at the input φi1, φi2 of each antenna A1, A2. The phase shift means M6 preferably comprise a clock H that serves to generate an oscillation frequency for the two generators G1, G2, for example a frequency equal to 13.56 MHz, and means for delaying a sinusoidal voltage signal from one voltage generator with respect to the other, which may consist of a "PLL" (phase locked loop), known to those skilled in the art.

The emission means E1, E2 consist, for each antenna A1, A2, of a filter and a matching circuit comprising:

a. For the first antenna A1:
   i. a filter F1, of "LC" filter type, consisting of a coil L1 and of a capacitor C11 connected to ground, ii. an impedance matching circuit 30 consisting of a capacitor C12 connected in series to the filter and a second capacitor C13 connected to ground,
b. for the second antenna A2, similarly:
i. a filter F2, of "LC" filter type, consisting of a coil L2 and of a capacitor C21 connected to ground,
ii. an impedance matching circuit 40 consisting of a capacitor C22 connected in series to the filter and a second capacitor C23 connected to ground.

The phase shift between the emission of the two antennas may also be created by using variable capacitors in the matching circuit of each antenna A1, A2. The phase shift means M6 for a phase shift between the emissions of the antennas illustrated in FIG. 4 are in no way limiting, and any phase shift means known to those skilled in the art may be used.

The reception and processing means R for receiving and processing the magnetic field consist of:
a. Measuring means M1 for measuring the voltage V1, V2 and/or the phase $\varphi r1$, $\varphi r2$ between the current and the voltage at the output of said antennas A1, A2,
b. Comparison means M2 for comparing between the voltage values V1, V2 and/or the phase values $\varphi r1$, $\varphi r2$ thus measured at the output of the antennas with predetermined voltage values V1ref, V2ref and/or phase values $\varphi 1ref$, $\varphi ref$,
c. Storage means M3 for storing the measured values,
d. Detection means M4 for detecting an object, for locating said object and type of object on the reception surface on the basis of the result of the comparison,
e. Control means M5 for controlling the charging on the basis of the detection thus performed.

Of course, other parameters representative of the magnetic field generated by the antennas may be used, such as for example the amplitude of the current flowing through the antenna.

The measuring means M1, the comparison means M2, the storage means M4 and the determination means M5 are in the form of software contained in an integrated circuit located for example in the microcontroller 10'.

The charging control method illustrated in FIG. 5 will now be described.

Figure 5:
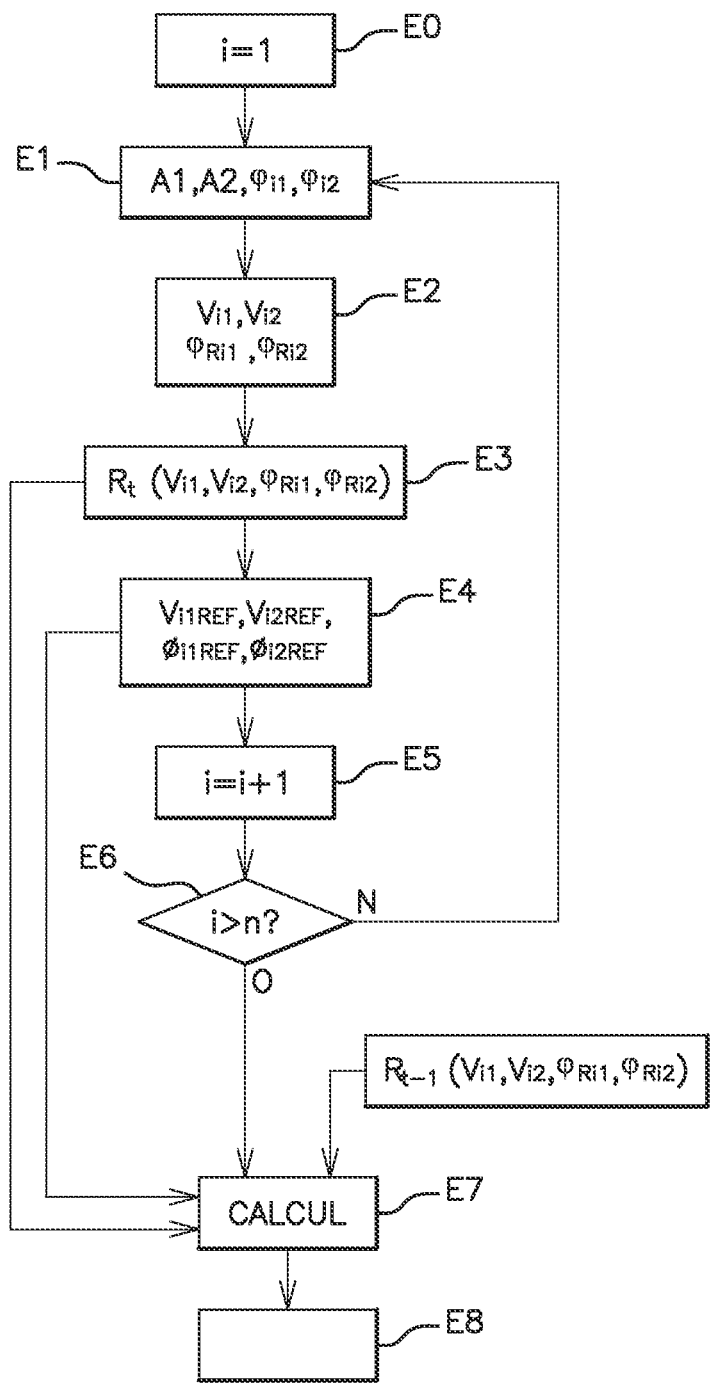
FIG. 5 is a flowchart showing the charging control method according to the invention.

In a preliminary step, not shown in FIG. 5, the charging device D is equipped with the two magnetic antennas A1 and A2 and with magnetic field emission means E1, E2 and magnetic field reception and processing means R, as described above.

In a first step E1, the method is initiated (with i=1) by applying a first phase shift $\Delta \varphi i$ between the two antennas, for example the phase at the input of the second antenna A2 $\varphi i2=80°$, and the phase at the input of the first antenna A1 $\varphi i1=0°$, and the simultaneous emission of the two antennas A1, A2 is activated such that they emit in a phase-shifted manner, that is to say:

$$\Delta i\varphi = \varphi i2 - \varphi i1 = 80°.$$ [Math 1]

Figure 6:
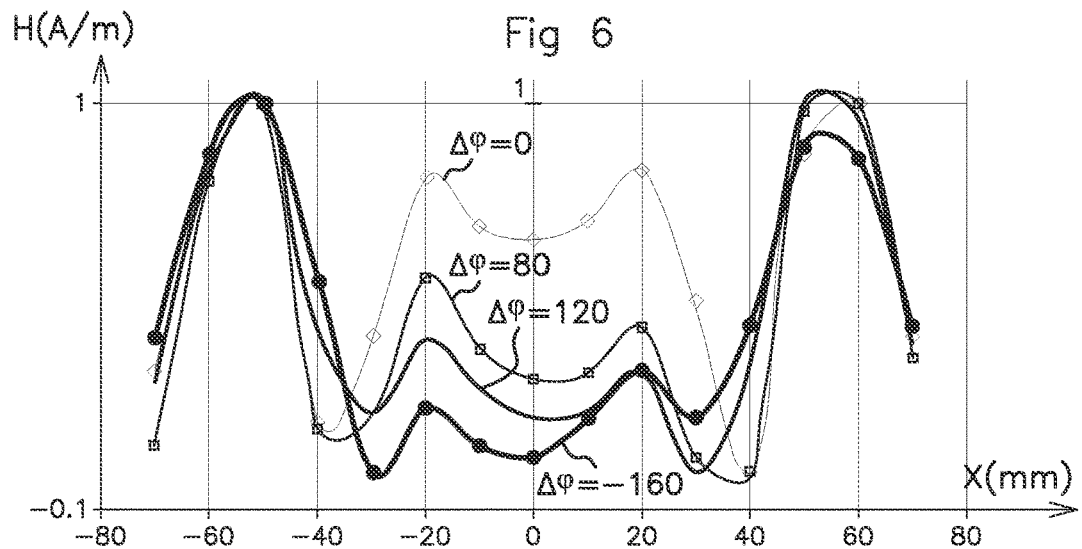
FIG. 6 is a graph showing, along the longitudinal X axis of the charging device, the distribution of the resulting magnetic field emitted by the two antennas, for various phase shift values between the two antennas, during the implementation of the method according to an aspect of the invention.

The two antennas A1, A2 then each simultaneously emit a magnetic field above the reception surface S, the resulting field H of which is as illustrated in FIG. 6.

FIG. 6 shows the normalized magnetic field H in A/m (amperes/meter) resulting from the simultaneous emission of the two antennas A1, A2, along the longitudinal X axis of the charging device D for various phase shift $\Delta \varphi i$ values of the voltage signal at input between the two antennas A1, A2.

The magnetic field H resulting from a phase shift of $-160°$ between the two antennas is represented by the curve comprising circles, that corresponding to a phase shift of 0° is represented by the curve comprising diamonds, that corresponding to a phase shift of 80° is represented by the curve comprising squares, and that corresponding to a phase shift of 120° is represented by the curve comprising crosses.

The resulting magnetic field H has a profile, that is to say values, along the longitudinal X axis, which varies (vary) as a function of the emission phase shift between the two antennas A1, A2, which results in the antennas A1, A2 also receiving a different magnetic field from the other antenna and the values of the voltage Vi1, Vi2 and/or of the phase shift $\varphi ir1$, $\varphi ir2$ measured at the output of said antennas A1, A2 also being different.

The resulting magnetic field H thus generated by the simultaneous and phase-shifted emission of the antennas A1, A2 is also impacted by:
a. the presence of any object placed on the reception surface S,
b. the location of the object on the reception surface S
c. and the type of object (mobile telephone, foreign metallic object, etc.)

This also has the effect of modifying the voltage values V1, V2 and/or phase values $\varphi r1$, $\varphi r2$ measured at the output of the antennas A1, A2 with respect to reference voltage and/or phase values V1ref, V2ref, $\varphi i1ref$, $\varphi i2ref$ for which no object is placed on the reception surface S.

Figure 7:
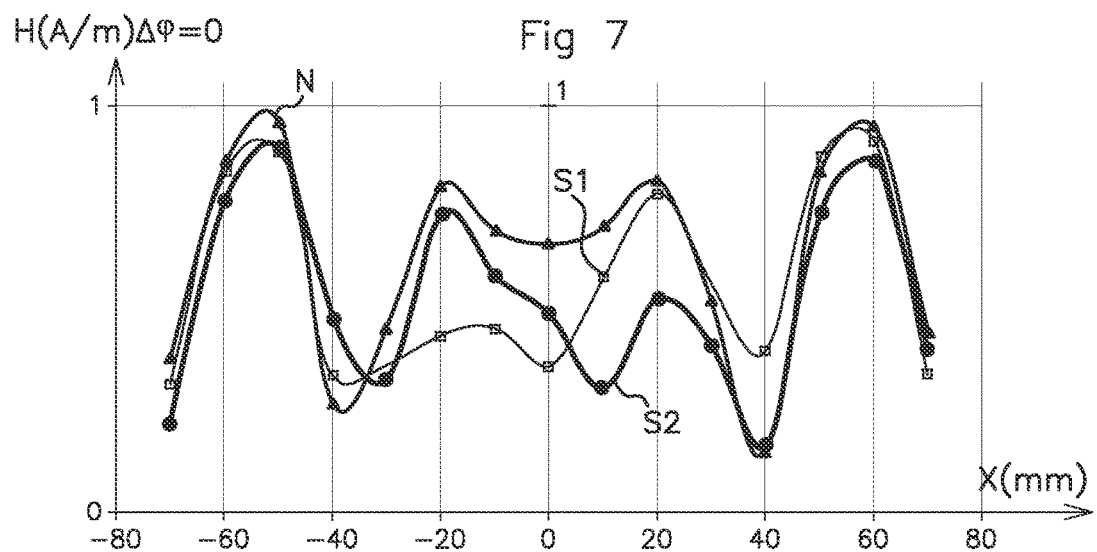
FIG. 7 is a graph showing, along the longitudinal axis of the charging device, the distribution of the resulting magnetic field emitted by the two antennas, for a phase shift value of zero, and for three different configurations: without an object located on the reception surface, with a telephone placed on the right-hand side (along the X axis) of the reception surface S, and with a telephone placed on the left-hand side (along the X axis) of the reception surface during the implementation of the charging control method according to an aspect of the invention.
Figure 8:
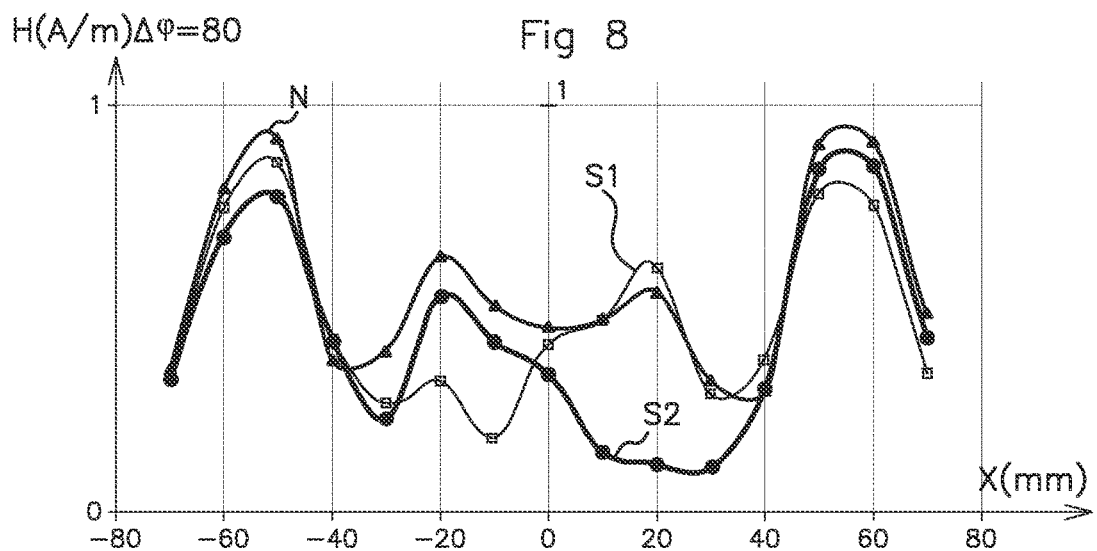
FIG. 8 is a graph showing, along the longitudinal axis of the charging device, the distribution of the magnetic field emitted by the two antennas, for a phase shift value equal to 80°, and for three different configurations: without an object located on the reception surface, with a telephone placed on the right-hand side (along the X axis) of the reception surface S, and with a telephone placed on the left-hand side (along the X axis) of the reception surface during the implementation of the charging control method according to an aspect of the invention.

The impact of an object placed on the reception surface S on the resulting magnetic field H is illustrated in FIGS. 7 and 8.

For a phase shift of zero $\Delta \varphi = 0°$ (configuration no. 6) between the antennas A1, A2, the resulting magnetic field H is illustrated in FIG. 7 for three cases:
a. Without an object placed on the reception surface S, corresponding to the curve "N" illustrated with circles,
b. With a telephone P placed on the right-hand side of the charging device D, along the X axis, corresponding to the curve "S1" illustrated with squares,
c. With a telephone P placed on the left-hand side of the charging device D, along the X axis, corresponding to the curve "S2" illustrated with crosses.

For each of these cases, the value of the voltage and/or of the phase V1, V2, $\varphi r1$, $\varphi r2$ measured at the output of the antennas A1, A2 are different.

Similarly, for a phase shift equal to 80° (configuration no. 1), $\Delta \varphi = 80°$, the resulting magnetic field H is illustrated in FIG. 8 for three cases:
a. Without an object placed on the reception surface S, corresponding to the curve "N" illustrated with circles,
b. With a telephone P placed on the right-hand side of the charging device D, along the X axis, corresponding to the curve "S1" illustrated with squares,
c. With a telephone P placed on the left-hand side of the charging device D, along the X axis, corresponding to the curve "S2" illustrated with crosses.

For each of these cases, the value of the voltage and/or of the phase measured at the output of the antennas A1, A2 are also different.

In a second step E2 of the method, the voltage values Vi1, Vi2 and/or phase values $\varphi ir1$, $\varphi ir2$ at the output of said antennas are measured.

In a third step E3, the measured voltage values Vi1, Vi2 and/or phase values $\varphi i1$, $\varphi i2$ are stored.

Next, in a fourth step E4, said values thus measured are compared with reference values Vi1ref, V2iref, $\varphi 1iref$, $\varphi 2iref$ that were predetermined beforehand for the same phase values $\varphi i1$, $\varphi i2$ at the input of the antennas, that is to say for the same phase shift value $\Delta i\varphi$ at input between the antennas.

During this preliminary calibration, voltage and phase measurements V1ref, V2ref, φi1ref, φi2ref at the output of each antenna A1, A2 were determined for various configurations i corresponding to various phase values φi1, φi2 at the input of the antennas A1, A2 and for the following scenarios:

a. without an object located on the reception surface S,
b. and/or for a plurality of metallic object locations on the reception surface S,
c. and/or for a plurality of types of metallic object placed on the reception surface S: mobile telephone or foreign object (for example a paperclip, or a coin, etc.)

TABLE 1

| φi1 | φi2 | Configuration i | Vi1ref (V) | Vi2ref (V) | φi1ref (°) | φi2ref (°) |
|---|---|---|---|---|---|---|
| 0 | 80 | 1 | 9.8 | 8.1 | 85 | 102.5 |
| 0 | 100 | 2 | 9.6 | 7.9 | 85.2 | 102.4 |
| 0 | 120 | 3 | 9.4 | 7.8 | 94 | 79.1 |
| 0 | 140 | 4 | 9.1 | 7.9 | 92.5 | 81.7 |
| 0 | 160 | 5 | 8.7 | 8.1 | 90.3 | 84.7 |
| 0 | 0 | 6 | 9.3 | 9.3 | 91.7 | 91.7 |
| 0 | x | N | ... | ... | ... | ... |

By way of example, the above table illustrates the values measured during the preliminary calibration phase in case a), that is to say without an object located on the reception surface S.

Thus, according to the above table; in the first configuration i=1, and the phase at the input of the first antenna A1 is equal to φ11=0°, and the phase at the input of the second antenna A2 is equal to φ12=80°.

During this fourth step E4, for each ith configuration, a comparison is obtained between the measured values and predetermined values, for each scenario, in this case for example for the scenario in which the predetermined values correspond to case a), that is to say without an object placed on the reception surface S, as illustrated in the table below:

TABLE 2

| Configuration i | Predetermined values | | | | Measured values | | | |
|---|---|---|---|---|---|---|---|---|
| | Vi1ref (V) | Vi2ref (V) | φi1ref (°) | φi2ref (°) | Vi1 (V) | Vi2 (V) | φir1 (°) | φir2 (°) |
| 1 | 9.8 | 8.1 | 85 | 102.5 | 9.4 | 8.8 | 95.1 | 77.9 |
| 2 | 9.6 | 7.9 | 85.2 | 102.4 | 9.2 | 7.9 | 95.2 | 77.6 |
| 3 | 9.4 | 7.8 | 94 | 79.1 | 9 | 7.8 | 94.6 | 78.8 |
| 4 | 9.1 | 7.9 | 92.5 | 81.7 | 8.6 | 7.9 | 93.3 | 81.2 |
| 5 | 8.7 | 8.1 | 90.3 | 84.7 | 8.3 | 8.1 | 91.4 | 84.2 |
| 6 | 9.3 | 9.3 | 91.7 | 91.7 | 8.9 | 9.4 | 87.8 | 90.6 |
| n | ... | ... | ... | ... | ... | ... | ... | ... |

The charging control method is then reiterated, for a following configuration i+1, corresponding to different phase values at the input of the antennas A1, A2, for example for the second configuration, that is to say i=2: the phase at the input of the second antenna A2 is equal to φ22=100°, and the phase at the input of the first antenna A1 is equal to φ21=0°.

The method is thus repeated for the i configurations, in our example, i=n. All of the measurements are thus stored (step E4) for each phase shift configuration.

When the last configuration has been carried out, that is to say i>n, then a computing step E7 makes it possible, by using all of the values thus measured and by comparing them with the predetermined values, to:

a. detect an object placed on the reception surface S
b. to locate said metallic object on the reception surface S and
c. to determine its type.

According to the above table, with the measured values being different from the predetermined values to within a measurement tolerance, for example +/−3%, it may be deduced therefrom that an object is placed on the reception surface S.

The location of the object may be determined by computing the sum of the differences between the measured values and the predetermined values and by comparing them with predetermined thresholds, as illustrated in the table below:

TABLE 3

| Measured values | | | | Differences (%) | | | |
|---|---|---|---|---|---|---|---|
| Vi1 (V) | Vi2 (V) | φir1 (°) | φir2 (°) | Vi1 − Vi1ref | Vi2 − Vi2ref | φir1 − φi1ref | φir2 − φi2ref |
| 9.4 | 8.8 | 95.1 | 77.9 | −4.3% | 9.4% | 11.9% | −24% |
| 9.2 | 7.9 | 95.2 | 77.6 | −4.4% | 0% | 11.7% | −24.3% |
| 9 | 7.8 | 94.6 | 78.8 | −4.5% | 0.5% | 0.7% | −0.4% |
| 8.6 | 7.9 | 93.3 | 81.2 | −4.8% | 0.4% | 0.9% | −0.6% |
| 8.3 | 8.1 | 91.4 | 84.2 | −5% | 0.7% | 1.1% | −0.6% |
| 8.9 | 9.4 | 87.8 | 90.6 | −4.7% | 0.9% | −4.2% | −1.2% |
| Sum (Σ) | | | | −27.7% | 11.9% | 22% | −51% |

In this case, in the above example, if the sum of the differences between the measured and predetermined value of the voltage at the output of the first antenna is less than zero:

$$\Sigma(Vi1 - Vi1\text{ref}) < 0\%$$ [Math 2]

And if the sum of the differences between the measured and predetermined value of the voltage at the output of the second antenna is greater than zero, that is to say if:

$$\Sigma(Vi2 - Vi2\text{ref}) > 0\%$$ [Math 3]

Then it is deduced therefrom that the metallic object is located near the first antenna A1.

It is also possible, as an alternative, to compare the phase measurements, and if the sum of the differences between the measured and predetermined value of the phase at the output of the first antenna is greater than zero, that is to say if:

$$\Sigma(\varphi ir1 - \varphi i1\text{ref}) > 0\%$$ [Math 4]

And if the sum of the differences between the measured and predetermined value of the phase at the output of the second antenna is less than zero, that is to say if:

$$\Sigma(\varphi ir2 - \varphi i2\text{ref}) < 0\%$$ [Math 5]

Then the metallic object is detected as being located near the first antenna A1.

Of course, it is possible to use the comparison performed based either on the voltage measurement or on the phase measurement, as described above, or else, as an alternative, it is possible to perform the comparison for both parameters, voltage and phase, in order to detect the presence of the metallic object.

This is just one example of a comparison performed in step 7. The thresholds may be adapted depending on the type of object and make it possible to distinguish between the detection of a telephone compatible with inductive charging and a foreign metallic object.

Those skilled in the art have available to them any statistical and/or mathematical tool for comparing measured values with predetermined values corresponding to the various cases: without an object on the reception surface S, for various locations of a metallic object on the reception surface S and finally for various types of metallic object placed on the reception surface S, in order to detect the presence of an object, its location and its type.

In one particular embodiment of the charging control method according to the invention, the predetermined values may consist of parameter measurements that are performed at a previous time for the same phase shift value at the inputs of the antennas A1, A2. For example, at a time t, with an initial phase shift value of 80°, the voltage and/or phase values at the output of the antennas V1, V2, φr1, φr2, which are measured and stored, are then compared with new measurements of voltage and/or phase values at the output of the antennas V1, V2, φr1, φr2 that are measured at a time t+1, with the same phase shift of 80°. This embodiment makes it possible to determine whether the object has moved.

Specifically, if the measurements performed at t and at t+1 are different for one and the same phase shift, this means that the object has moved over the reception surface S, in order to restart the charging control method at the new location.

The charging control is then adapted appropriately, as follows:
  a. If the detected object is a foreign metallic object, the charging is stopped,
  b. If the detected object is a mobile telephone, located at one end of the reception surface, the nearest coil is activated.
  c. Depending on the position determined with respect to the emitter coils, the charging power may be reduced or increased.

Charging control or adaptation strategies based on the type and the position of a metallic object on the reception surface S are known to those skilled in the art.

An aspect of the invention therefore expediently makes it possible to control the charging by detecting and by locating a metallic object, be this a portable item of user equipment or a foreign metallic object on the reception surface S of a charging device D', specifically by cleverly using the variation of the magnetic field H resulting from the simultaneous emission of two phase-shifted radiofrequency antennas.

The invention is all the more advantageous in the preferred embodiment of the invention, since the two antennas consist of NFC antennas that are already present in the charging device D' and used in order to communicate in NFC mode during charging.

The invention claimed is:

1. A method for controlling the inductive charging of a portable item of user equipment by a charging device, said charging device comprising a reception surface able to receive the item of user equipment, emitter coils and a magnetic field guide able to direct a magnetic field in a plane parallel to the reception surface, the charging device is equipped in a preliminary step with at least two magnetic antennas, each designed to emit a magnetic field and each designed to partially receive the magnetic field emitted by the other antenna, the method comprising:
  a) Simultaneous emission by the two antennas, having a first phase shift at input with respect to one another;
  b) Measurement of at least one parameter at the output of the antennas;
  c) Storage of the measured parameter;
  d) Comparison between the at least one parameter thus measured and a predetermined value;
  e) Repetition of the preceding steps for other phase shift values; and
  f) Controlling of the charging based on the comparison results.

2. The inductive charging control method as claimed in claim 1, wherein the measured parameters consist of a voltage and/or a phase between the current and the voltage that are measured at the output of each antenna.

3. The inductive charging control method as claimed in claim 2, wherein the predetermined value comprises parameters measured without a metallic object on the reception surface.

4. The inductive charging control method as claimed in claim 1, wherein the predetermined value comprises parameters measured for a plurality of locations of metallic objects on the reception surface.

5. The inductive charging control method as claimed in claim 1, wherein the predetermined value furthermore comprises parameters measured for a plurality of types of metallic object.

6. The inductive charging control method as claimed in claim 1, wherein the predetermined value consists of parameters measured at a previous time, for one and the same phase shift value.

7. A device for the inductive charging of a portable item of user equipment, intended to be housed on board a motor vehicle, comprising:
  a reception surface able to receive the item of user equipment;
  emitter coils;
  a magnetic field guide able to direct a magnetic field in a plane parallel to the reception surface;
  At least two magnetic antennas, each designed to emit a magnetic field and each designed to partially receive the magnetic field emitted by the other antenna;
  emission means electrically connected to the two antennas, comprising phase shift means for a phase shift between the antennas; and
  reception and processing means comprising:
    i) measuring means for measuring at least one parameter at the output of the antennas,
    ii) storage means for storing the measured parameter,
    iii) comparison means for comparing between the at least one parameter thus measured and a predetermined value,
    iv) detection means for detecting an object, for locating said object and type of object on the reception surface on the basis of the result of the comparison,
    v) control means for controlling the charging on the basis of the detection performed.

8. The charging device as claimed in claim 7, wherein the measuring means for measuring parameters consist of measuring means for measuring a voltage and/or measuring means for measuring a phase at the output of the antennas.

9. The charging device as claimed in claim 7, wherein the magnetic field guide consists of a ferrite.

10. The charging device as claimed in claim 9, wherein the antennas are in the form of loops wound around the ferrite.

11. The charging device as claimed in claim 7, wherein the antennas are in the form of planar windings located in a plane parallel to the reception surface.

12. The charging device as claimed in claim 7, wherein an emission frequency of the two magnetic antennas is between 20 KHz and 20 MHz.

13. The charging device as claimed in claim 7, wherein the antennas are near-field communication radiofrequency antennas.

14. The charging device as claimed in claim 7, wherein the antennas are inductive charging antennas.

15. A motor vehicle, comprising a charging device as claimed in claim 7.

16. The inductive charging control method as claimed in claim 2, wherein the predetermined value consists of parameters measured at a previous time, for one and the same phase shift value.

17. The charging device as claimed in claim 8, wherein the magnetic field guide consists of a ferrite.

\* \* \* \* \*